US012772365B2

(12) United States Patent
Rose-Petruck et al.

(10) Patent No.: US 12,772,365 B2
(45) Date of Patent: Oct. 20, 2026

(54) PICOSECOND LASER-DRIVEN PLASMA X-RAY SOURCE

(71) Applicant: RESEARCH INSTRUMENTS CORPORATION, Barrington, RI (US)

(72) Inventors: Christoph Rose-Petruck, Barrington, RI (US); Daniel DeCiccio, Providence, RI (US)

(73) Assignee: RESEARCH INSTRUMENTS CORPORATION, Barrington, RI (US)

( * ) Notice: Subject to any disclaimer, the term of this patent is extended or adjusted under 35 U.S.C. 154(b) by 65 days.

(21) Appl. No.: 18/458,603

(22) Filed: Aug. 30, 2023

(65) Prior Publication Data

US 2024/0237183 A1 Jul. 11, 2024

Related U.S. Application Data

(60) Provisional application No. 63/497,142, filed on Apr. 19, 2023, provisional application No. 63/373,963, filed on Aug. 30, 2022.

(51) Int. Cl.
*H05G 2/00* (2006.01)

(52) U.S. Cl.
CPC ......... *H05G 2/0088* (2024.08); *H05G 2/0035* (2024.08)

(58) Field of Classification Search
CPC ...... H05G 2/005; H05G 2/0088; H05G 2/008; H05G 2/0035; H05G 2/003; H05G 2/0092; H05G 2/006; H05G 2/002; H05G 2/0025; H05G 2/0086; H05G 2/009; H05G 2/0094; H05G 2/001; H05G 2/0082; H05G 2/00; H05G 2/0084; H01J 29/563; H01J 29/58; H01J 31/50; H01J 37/15; H01J 37/04; H01J 31/04; H01J 37/147; H01J 2237/032; H01J 2237/1502; H01J 2229/58; H01J 2237/0835; H01J 35/186; H01J 35/116; H01J 35/112; H01J 2235/081; H01J 2235/082; H01J 35/06; H01J 35/065; H01J 37/244; H01J 31/48; H01J 37/261;
(Continued)

(56) References Cited

U.S. PATENT DOCUMENTS

| | | | |
|---|---|---|---|
| 4,484,339 | A | 11/1984 | Mallozzi et al. |
| 4,704,718 | A | 11/1987 | Suckewer |

(Continued)

FOREIGN PATENT DOCUMENTS

| | | | |
|---|---|---|---|
| CA | 2436879 | A1 | 2/2004 |
| WO | 2007091989 | A2 | 8/2007 |
| WO | 2024200461 | A1 | 10/2024 |

OTHER PUBLICATIONS

"International Search Report and Written Opinion received for PCT Patent Application No. PCT/US2023/073162, mailed on Feb. 7, 2024", 10 pages.

(Continued)

*Primary Examiner* — Irakli Kiknadze
(74) *Attorney, Agent, or Firm* — Adler Pollock & Sheehan P.C.

(57) ABSTRACT

A laser-produced plasma X-ray system includes a metal target, a laser pulse emitter producing laser pulses in the range of 150 fs to 25 ps, prepulses nanoseconds before the main pulse, and focusing optics directing the laser pulses onto the target surface, forming a laser-driven plasma that emits X-rays.

16 Claims, 3 Drawing Sheets

(58) Field of Classification Search

CPC ...... H01J 2237/24585; H01J 2237/047; G01N 23/20008; G01N 23/201; G01N 23/046; G01N 2223/3035; G01N 21/6458; G01N 23/041; G01N 33/54346; G01N 33/587; G01N 33/57525; G01N 33/5011; G01N 33/56966; G01N 33/575; G01N 33/5758; G01N 2500/00; G21K 7/00; G21K 1/062; G21K 2207/005; G21K 1/06; G02F 1/139; G02F 2203/12; G02F 2203/05; G02B 27/288; B82Y 10/00; B82Y 5/00; G03F 7/70033; G03F 7/70175; G03F 7/70916; A61B 6/508; A61B 6/482; A61B 6/504; A61B 6/484; A61B 6/481; A61B 6/4092; A61B 6/06; A61B 6/4291; A61B 6/4028; A61B 6/0407; A61K 41/0052; A61K 47/6923; A61K 9/5031; A61K 31/711; A61K 41/0038; A61K 47/60; A61K 49/0461; A61K 49/0428; C12Q 1/6816; C12Q 2563/155; C12Q 2565/519; C12Q 2565/628; A61M 5/007; A61L 2/007; A61L 2202/11; A61L 2202/24; A61N 5/10; A61N 5/1015; A61N 5/1077; A61N 2005/1088; A61N 2005/1089; H05H 15/00; H05H 2277/11; H05H 2277/113; H01S 4/00; G21G 4/00

USPC .......................... 378/119, 123, 125, 143, 145

See application file for complete search history.

(56) References Cited

U.S. PATENT DOCUMENTS

| | | | | |
|---|---|---|---|---|
| 5,151,928 | A * | 9/1992 | Hirose | G03F 7/70033 372/5 |
| 5,335,258 | A | 8/1994 | Whitlock | |
| 5,353,291 | A * | 10/1994 | Sprangle | H05H 11/02 372/5 |
| 5,606,588 | A | 2/1997 | Umstadter et al. | |
| 6,594,335 | B2 * | 7/2003 | Davidson | A61B 6/4092 378/43 |
| 2002/0141536 | A1 * | 10/2002 | Richardson | H05G 2/003 378/119 |
| 2004/0176677 | A1 * | 9/2004 | Hwu | A61B 6/508 600/407 |
| 2009/0201575 | A1 * | 8/2009 | Fermann | H01S 3/06754 359/341.32 |
| 2018/0206320 | A1 * | 7/2018 | Rose-Petruck | H05G 2/0086 |
| 2018/0323032 | A1 * | 11/2018 | Strelec | H01J 35/186 |
| 2019/0069385 | A1 | 2/2019 | Khodykin | |
| 2019/0235346 | A1 | 8/2019 | Royon et al. | |
| 2022/0256681 | A1 | 8/2022 | Deciccio et al. | |

OTHER PUBLICATIONS

Dusterer, et al., "Enhancement of Laser-Plasma EUV Conversion Efficiency by Introduction of Prepulses", Summaries of Papers Presented at the Lasers and Electro-Optics, CLEO 2002, 2002, pp. 441-442.

optics.org , "Flexible Slab Laser Gives Industry an Alternative", Historical Archive, Retrieved Online via <https://optics.org/article/33528>, Mar. 27, 2008, 3 pages.

Umstadter, "Bright Ultrashort X-Rays from Intense Subpicosecond Laser-Plasma Interactions", IEEE International Conference on Plasma Science, 1995, p. 171.

"Extended European Search Report received for EP Patent Application No. 23861527.2, mailed on Jul. 29, 2026", 12 pages.

Cote, et al., "Time-Resolved X-Ray Spectroscopy of Ultrashort Plasmas", Plasma Science, IEEE Conference Record—Abstracts, 1993, pp. 145.

Garmatina, et al., "Femtosecond High Repetition Rate Fiber Laser-Driven Plasma Microfocus X-Ray Source for Imaging Applications", 2022 International Conference Laser Optics, 2022, 1 page.

Nam, et al., "The Effect of Prepulse On X-Ray Laser Development Using a Powerful Subpicosecond KrF Laser", 2318b Applied Physics B: Photo-Physics and Laser Chemistry, vol. B50, No. 4, Apr. 1990, pp. 275-285.

Pelletier, et al., "Soft X-Ray Emission Produced by a Sub-Picosecond Laser in a Single and Double-Pulse Scheme", Journal of Applied Physics, American Institute of Physics, vol. 81, No. 9, May 1, 1997, pp. 5980-5983.

* cited by examiner

300

400

500

PICOSECOND LASER-DRIVEN PLASMA X-RAY SOURCE

CROSS-REFERENCE TO RELATED APPLICATION(S)

The present application claims priority benefit of U.S. Provisional Application No. 63/373,963, filed Aug. 30, 2022, and U.S. Provisional Application No. 63/497,142, filed Apr. 19, 2023, which are herein incorporated by reference in their entireties.

BACKGROUND OF THE INVENTION

The present patent application relates to X-ray instruments and more specifically to a picosecond laser-driven plasma X-ray source.

The study of the structural dynamics and static mechanics in matter has been enabled by experimental tools such as time-resolved x-ray diffraction, X-ray absorption, and micro CT. High-Energy X-rays are usually produced by the interaction of femtosecond laser pulses with intensities of $10^{18}$ W/cm$^2$ and higher.

SUMMARY OF THE INVENTION

In one aspect, the invention features a laser-produced plasma X-ray system including a metal target, a laser pulse emitter producing laser pulses in the range of 150 fs to 25 ps, and focusing optics directing the laser pulses onto the target surface, forming a laser-driven plasma that emits X-rays.

These and other advantages of the invention will be further understood and appreciated by those skilled in the art by reference to the following written specification, claims and appended drawings.

DETAILED DESCRIPTION OF THE PREFERRED EMBODIMENT(S)

Figure 1:
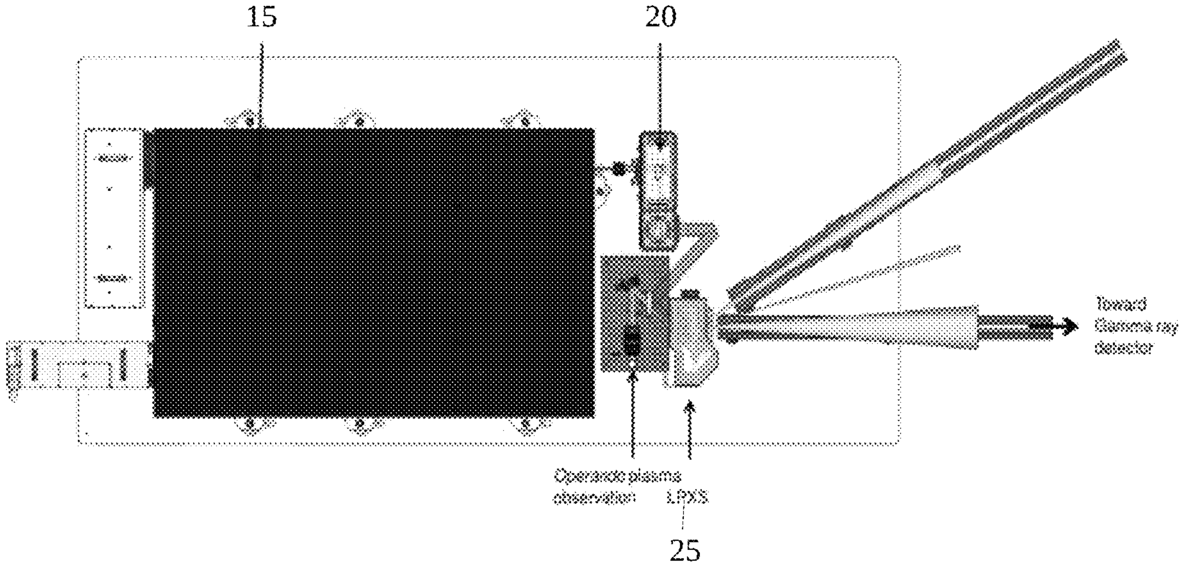
FIG. 1 is a block diagram of a system.

It is to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

High-intensity laser pulses incident onto a solid-density target cause the emission of X-ray pulses with line and continuum (Bremsstrahlung) emission. While the target material determines the photon energies of the spectral lines, the continuum radiation is not characteristic of the target material. Electrons are produced in the early phases of the laser pulse interaction with the target. Interaction details depend on the intensity and pulse structure of the laser light. The polarization of the light relative to the target surface and the laser beam incidence angle onto the target surface is also important. A high-contrast (on the picosecond timescale) laser pulse interacts with a steep density gradient at the target surface. Electrons are accelerated and penetrate the solid-density target material. The accelerated electrons penetrate the underlying solid-density target, producing bremsstrahlung and fluorescence line emission. Prepulses arriving on target a few picoseconds before the main pulse can enhance the X-ray emission yield. The prepulses create a target vapor density profile with a scale length of several wavelengths in front of the target. This effectively enhanced the coupling of laser light into plasma waves, accelerating electrons through resonance absorption. Consequently, laser light is more strongly coupled to the plasma than interactions with a steep density gradient. This effect enhances the electron acceleration, leads to higher energy X-rays and an increased X-ray flux.

The present patent relates to X-ray instruments and more specifically to a laser-driven plasma X-ray source (LPXS) with a liquid metal target that is driven by laser pulses with picosecond pulse duration, where picosecond prepulses arrived a few nanoseconds before the main pulse are key for generating the high-energy X-rays.

Table-top X-ray instruments such as X-ray microscopes require high-brilliance X-ray sources. The maximum power density limits the brilliance of a conventional X-ray tube that the anode can withstand without melting. Currently, most instruments use X-ray tubes with fixed or rotating anodes. An electron beam is focused onto the anode where it decelerates rapidly and emits continuum and line (fluorescence).

The operation conditions of the LPXS with 850-fs, 1030-nm laser pulses result in an unprecedented X-ray conversion efficiency that has not been reported in the prior art. Thus, the operation of laser-driven X ray sources with femtosecond (typically <100 fs) laser pulses is not prior art for the operation of LPXS with picosecond pulses. This is a new operation regime that is not obvious because the scaling laws introduced above suggest that increasing the laser intensity results in enhanced X-ray generation. The operation regime described here follows exactly the opposite path by increasing the pulse length and reducing the laser pulse intensity.

The subject technology includes a laser-driven X-ray source that operates with picosecond laser pulses generated by laser systems such as Yb:glass fiber and thin-disk lasers or Yb:YAG slab lasers. Here Yb denotes Ytterbium. A typical width of laser pulses emitted from such systems is about 1 ps. The laser pulses are focused onto a metal target, specifically a liquid metal target, where they create a plasma. This technology is not limited to liquid metal targets but also applies to other target materials both solid and liquid such as water, liquid noble gasses etc. Inside the plasma electrons are accelerated to high kinetic energies. These electrons, in turn, generate X-rays with energies that can reach into the MeV range. The pulse length of Yb laser systems is excellently suited for the efficient generation of high kinetic-energy electrons in the laser-driven plasma. Although the details of the physics of the interaction between the laser light and the target requires still more study, measurements demonstrate that the coupling is very efficient. Operating with shorter (about 100 femtosecond) pulses requires order of magnitude high laser light intensities on target for the production of hot electrons with a temperature above 100 keV.

One embodiment of the invention operates with 850 fs laser pulses, and 1030 nm wavelength. These pulse properties are typical for laser systems with Yb-doped active medium such as slab, fiber, of thin-disk laser systems. These lasers have a limited gain bandwidth of approximately one nanometer, limiting the shortest pulse they can generate. Therefore, pulse length in the range of 500 fs to about 15 ps are typical for these lasers.

Shorter pulse can be generated by non-linear bandwidth generation and pulse compression of the native laser pulses emitted by these systems, but such concepts add system cost and complexity. The invention of operating an LPXS with ps pulses is specifically intended for laser systems with Yb-doped active medium because it maximizes the X-ray performance while minimizing the laser system complexity.

In FIG. 1. an exemplary setup 10 includes a laser system 15, a laser beam expander 20 and a LPX 25. In one specific example, the laser system 10 is a DIRA 200-5 laser system from Trumpf Scientific. This regenerative amplifier is based on Yb-thin-disk laser technology. It can produce up to 40 mJ/pulse at 3 kHz repetition rate. The center laser wavelength is 1030 nm. The emitted pulses were compressed to 850 fs. The laser beam pulse structure is modified by a Pockels cell prepulse-suppressor located after the pulse compressor. The measured nanosecond prepulse intensity contrast on target was 1800. Following the suppressor, a beam expander that includes two parabolic mirrors in a vacuum chamber expands the laser beam to a fwhm-diameter of about 20 mm. The beam propagates to the parabola that focuses the laser beam onto a liquid metal target inside a vacuum chamber of the LPXS.

Figure 2:
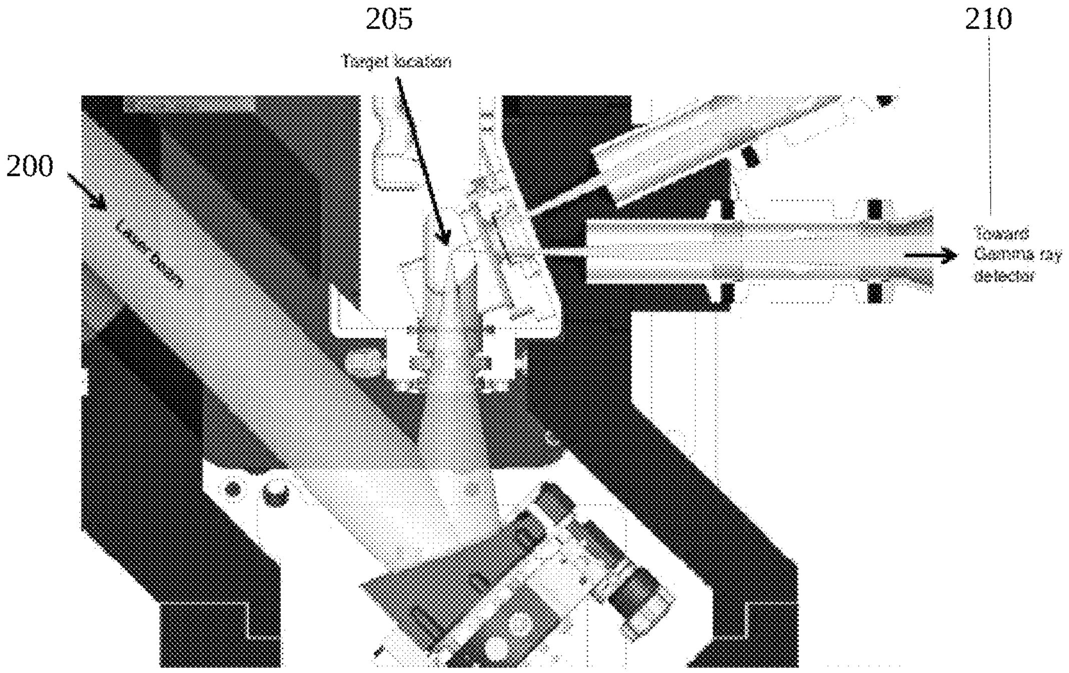
FIG. 2 is a cut-away of a system.

FIG. 2 shows a cut-away view of the laser focus 200 and X-ray emission geometry. The liquid metal target 205 is propagating in the LPXS vacuum chamber perpendicular to the picture plane. The laser beam is focused with an F-number of 6 onto the target jet. X-rays emitted toward the right are propagating to the Gamma-ray detector 210. For clarity, debris shields between the laser input and X-ray output windows are omitted in this drawing.

The laser beam enters the chamber through a curved laser window. A debris shield inside the chamber protects the window from target metal debris. Inside the chamber the laser beam interacts with a round liquid metal flow of 200 μm diameter. The target alloy (66% In, 34% Bi) is held at 75° C. The incidence angle on the target surface is approximately 45 deg. X-rays are observed at right angle relative to the laser beam. A second debris shield protects the X-ray output window for target debris.

X-rays are detected by a detector suite that includes an X-ray photon counting MCA, a CsI scintillation probe with MCA, and a silicon photodiode. This suite allows for the simultaneous detection of X-ray spectra below 50 keV photon energy, high-energy X-ray spectra from 30 keV to 4 MeV, and integrated X-ray pulse energies.

Figure 3:
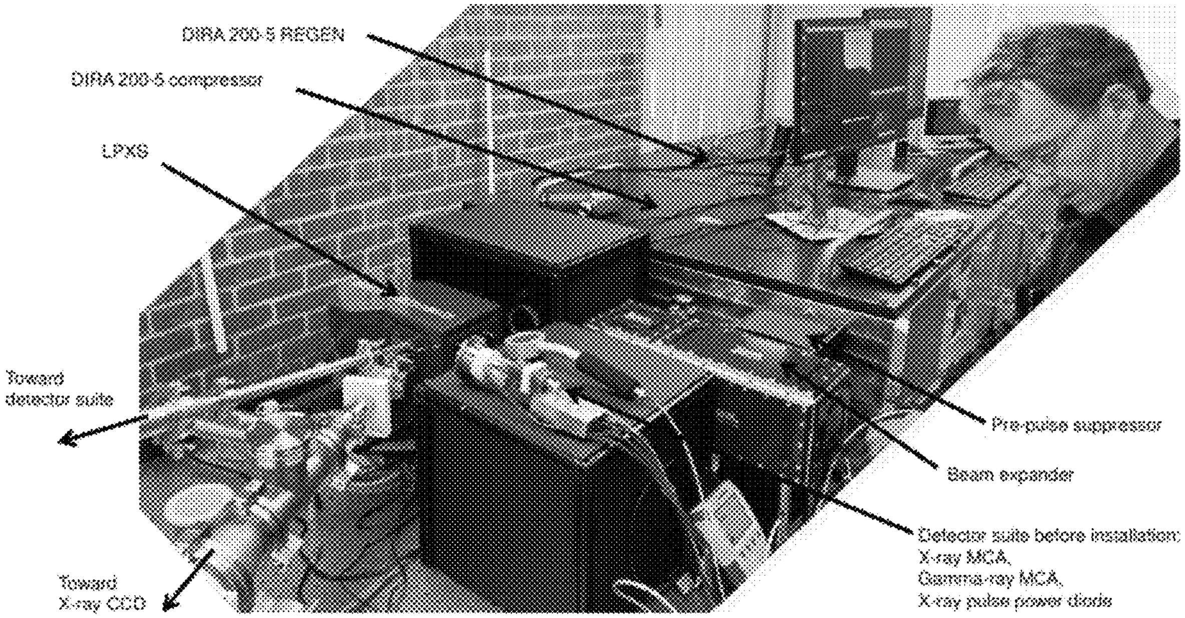
FIG. 3 is a photo of a system.

FIG. 3 shows a photo 300 of the laser-X-ray system. The detector suite can be seen on a black laser safety enclosure before its installation at the end of the X-ray beam transport tube. The detector suite was located at about 1 m distance from the plasma.

Results

Millijoule laser pulses (850 fs pulse length and 1030-nm wavelength) were focused onto the liquid metal target in the LPXS vacuum chamber. Laser prepulses arriving on target nanoseconds before the main laser pulse created an underdense Bi/In plasma volume in front of the solid-density target. The volume of this plasma could be varied by adjusting the prepulse timing. Emitted HEX-rays were detected by the CsI scintillation detector operating in single-photon count mode.

Figure 4:
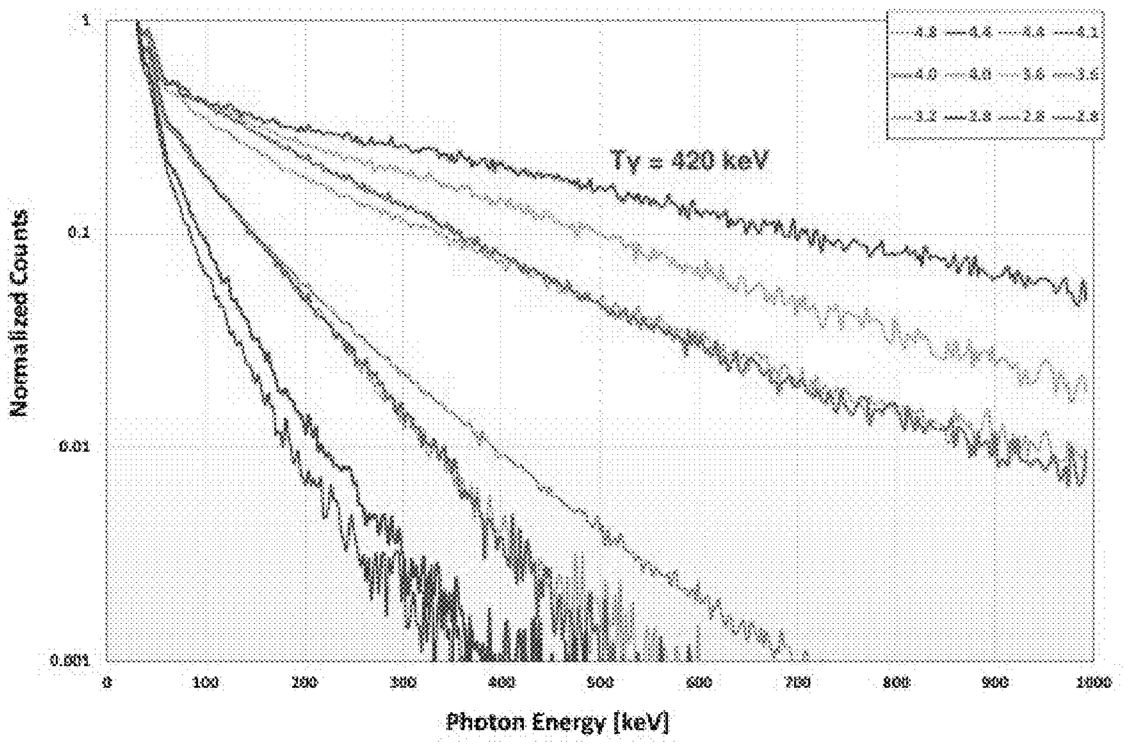
FIG. 4 is a graph.

FIG. 4 illustrates a graph 400 of high energy X-ray spectrum for various laser intensities on target. The legend labels indicate the laser intensity on target in units of $10^{15}$ W/cm$^2$. The maximum hot X-ray temperature Tγ of 420 keV is reached at $4.4\times10^{15}$ W/cm$^2$.

The data were normalized to 1 at 30 keV. Each curve is the average of several minutes of collected data. The spectra were fitted with two Boltzmann distributions. One described the energy distribution below about 50 keV. The second described the higher energy range. The maximum HEX-ray temperature was 420 keV with 4.4×10 15 W/cm2 on target. This intensity corresponded to 2.6 mJ laser pulse energy on target.

Figure 5:
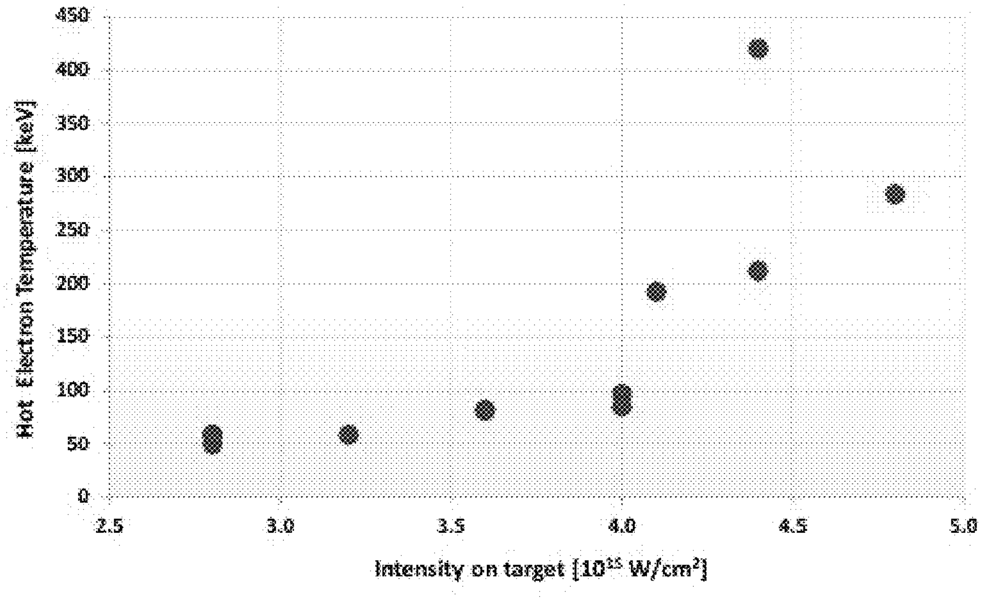
FIG. 5 is a graph.

FIG. 5 illustrates a graph 500 of high energy X-ray temperatures for various laser intensities on target. The maximum temperature of 420 keV is reached at $5\times10^{15}$ W/cm$^2$.

More specifically, the graph 500 shows the X-ray temperature as a function of laser intensity on target. There appears to be a threshold of $4\times10^{15}$ W/cm$^2$ after which the temperature rapidly increases. At $4.4\times10^{15}$ W/cm$^2$ the measured temperatures scatter widely. The highest temperature of 420 keV is reached this intensity while the temperature at $4.8\times10^{15}$ W/cm$^2$ is lower.

HEX-ray spectra reaching into the MeV spectral range where measured. While plasma physical simulations have not been completed yet, we hypothesize that the HEX-ray generation process relies two components: 1) Beginning a few ns before the main laser pulse arrives on target, laser-prepulses generate metal vapor in front of the liquid metal target. Owing to the low temperature and enthalpy of vaporization of the liquid metal, small prepulse intensities can heat the target enough to create a substantial gas density. 2) As the main laser pulse transverses and ionizes the metal vapor, two-plasmon decay instability in the underdense plasma accelerates electrons to MeV kinetic energy. Upon interaction of these electrons with the liquid metal target, MeV-range HEX-rays are produced. In this scheme laser-prepulses arriving on target nanoseconds before the main pulse, evaporate target metal, creating an underdense plasma extending tens of micometers in front of the solid-density target surface. The prepulse structure of the laser pulses was carefully controlled. Prepulses arrived on target a few ns before the main laser pulse. With prepulse intensities on target of less than 0.1% of the main pulse, optimal conditions were created for HEX-ray generation. These low prepulse intensities should be sufficient for underdense plasma generation because of the high vapor pressure of bismuth. For instance, increasing the temperature of the target surface form 75° C. to 1000° C. increases the vapor pressure to about 6 mb. Thus, other target metal compositions of even sold metal target likely would require much higher prepulse intensities for sufficient vapor production.

In summary, the laser-produced plasma X-ray system of the present invention includes a metal target, a laser pulse emitter producing laser pulses in the range of 150 fs to 25 ps, and focusing optics directing the laser pulses onto the target surface, forming a laser-driven plasma that emits X-rays. The focusing optics may produce a prepulse in the range of 1-50 picoseconds before a primary pulse or a prepulse in the range of 1-50 nanoseconds before a primary pulse. The system can include multiple laser pulses from multiple lasers are focused onto the metal target, and/or multiple laser prepulses are focused onto the metal target. The multiple laser prepulses may be focused onto the metal target.

In the foregoing description, it will be readily appreciated by those skilled in the art that modifications may be made to the invention without departing from the concepts disclosed herein. Such modifications are to be considered as included in the following claims, unless the claims by their language expressly state otherwise.

What is claimed is:

1. A laser-produced plasma X-ray system comprising:

a liquid metal target;

a laser pulse emitter producing laser pulses in the range of 150 fs to 25 ps;

focusing optics directing the laser pulses onto the liquid target surface, forming a laser-driven plasma that emits X-rays above 100 keV.

2. The laser-produced plasma X-ray system of claim 1 wherein the focusing optics produce a prepulse in the range of 1-50 picoseconds before a primary pulse.

3. The laser-produced plasma X-ray system of claim 1 wherein focusing electronics produce a prepulse in the range of 1-50 nanoseconds before a primary pulse.

4. The laser-produced plasma X-ray system of claim 1 wherein multiple laser pulses from multiple lasers are focused onto the liquid metal target.

5. The laser-produced plasma X-ray system of claim 4 wherein multiple laser prepulses are focused onto the liquid metal target.

6. The laser-produced plasma X-ray system of claim 1, wherein multiple laser prepulses are focused onto the liquid metal target.

7. The laser-produced plasma X-ray system of claim 1 wherein the laser pulse emitter uses an Yb-doped gain medium.

8. The laser-produced plasma X-ray system of claim 7 wherein the laser pulse emitter is a fiber laser system.

9. The laser-produced plasma X-ray system of claim 7 wherein the laser pulse emitter is a slab laser system.

10. The laser-produced plasma X-ray system of claim 7 wherein the laser pulse emitter is a thin-disk laser system.

11. The laser-produced plasma X-ray system of claim 1 wherein the laser pulse emitter uses a Thulium-doped gain medium.

12. The laser-produced plasma X-ray system of claim 11 wherein the laser pulse emitter is a fiber laser system.

13. The laser-produced plasma X-ray system of claim 11 wherein the laser pulse emitter is a slab laser system.

14. The laser-produced plasma X-ray system of claim 11 wherein the laser pulse emitter is a thin-disk laser system.

15. The laser-produced plasma X-ray system of claim 1 wherein an interaction region is contained in a low-pressure chamber.

16. The laser-produced plasma X-ray system of claim 1 wherein the focusing optics produce a prepulse having a different pulse duration from a main pulse.

* * * * *